(12) United States Patent
Lastras et al.

(10) Patent No.: US 9,189,330 B2
(45) Date of Patent: Nov. 17, 2015

(54) STALE DATA DETECTION IN MARKED CHANNEL FOR SCRUB

(71) Applicant: International Business Machines Corporation, Armonk, NY (US)

(72) Inventors: Luis A. Lastras, Cortlandt Manor, NY (US); Patrick J. Meaney, Poughkeepsie, NY (US); Eldee Stephens, Waterbury, CT (US); George C. Wellwood, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 176 days.

(21) Appl. No.: 13/860,740

(22) Filed: Apr. 11, 2013

(65) Prior Publication Data
US 2014/0310570 A1 Oct. 16, 2014

(51) Int. Cl.
*G11C 29/00* (2006.01)
*G06F 11/10* (2006.01)

(52) U.S. Cl.
CPC .............. *G06F 11/106* (2013.01); *G06F 11/10* (2013.01)

(58) Field of Classification Search
CPC ............ G06F 11/1076; G06F 11/1008; G06F 11/106; H05K 999/99; G11C 2029/0411
USPC ......................................................... 714/764
See application file for complete search history.

(56) References Cited

U.S. PATENT DOCUMENTS

| | | | |
|---|---|---|---|
| 7,173,852 B2 | 2/2007 | Gorobets et al. | |
| 7,454,668 B1 | 11/2008 | Yochai et al. | |
| 7,526,686 B2 | 4/2009 | Kolvick, Jr. | |
| 7,549,089 B1 | 6/2009 | Kimmel et al. | |
| 7,552,357 B2 | 6/2009 | Grcanac et al. | |
| 7,587,630 B1 | 9/2009 | Cassell et al. | |
| 7,823,011 B2 | 10/2010 | Kholakia et al. | |
| 7,908,512 B2 | 3/2011 | Deenadhayalan et al. | |
| 2004/0123032 A1* | 6/2004 | Talagala et al. | 711/114 |
| 2011/0302440 A1* | 12/2011 | DiMarco et al. | 713/340 |
| 2011/0320864 A1 | 12/2011 | Gower et al. | |
| 2011/0320869 A1 | 12/2011 | Gower et al. | |
| 2012/0173936 A1* | 7/2012 | Johnson et al. | 714/718 |
| 2014/0189417 A1* | 7/2014 | Hum et al. | 714/2 |

OTHER PUBLICATIONS

IBM, "Error-Correction Coding Scheme to Allow Marking of Stake Data," IP.com, IPCOM000067391D, Jul. 1, 1979, pp. 822-823.

* cited by examiner

*Primary Examiner* — Albert Decady
*Assistant Examiner* — Enam Ahmed
(74) *Attorney, Agent, or Firm* — Cantor Colburn LLP; Margaret McNamara (57) ABSTRACT

Embodiments relate to stale data detection in a marked channel for a scrub. An aspect includes bringing the marked channel online, wherein the computer comprises a plurality of memory channels comprising the marked channel and a remaining plurality of unmarked channels. Another aspect includes performing a scrub read of an address in the plurality of memory channels. Another aspect includes determining whether data returned by the scrub read from the marked channel is valid or stale based on data returned from the unmarked channels by the scrub read. Another aspect includes based on determining that the data returned by the scrub read from the marked channel is valid, not performing a scrub writeback to the marked channel. Another aspect includes based on determining that the data returned by the scrub read from the marked channel is stale, performing a scrub writeback of corrected data to the marked channel.

7 Claims, 11 Drawing Sheets

| OPERATION | CHANNEL 0 | CHANNEL 1 | CHANNEL 2 | CHANNEL 3 | CHANNEL 4 |
|---|---|---|---|---|---|
| EXIT RECOVERY 401 | | MARKED | | | |
| SCRUB STORE A (R/W) 402 | A0->A0 | (L)->A1 | A2->A2 | A3->A3 | A4->A4 |
| SCRUB STORE B (R) 403 | B0 | B1 | B2 | B3 | B4 |
| SCRUB STORE C (R) 404 | C0 | C1 | C2 | C3 | C4 |
| SCRUB STORE D (R/W) 405 | D0->D0 | (M)->D1 | D2->D2 | D3->D3 | D4->D4 |

| | CHANNEL 0 | CHANNEL 1 | CHANNEL 2 | CHANNEL 3 | CHANNEL 4 |
|---|---|---|---|---|---|
| REAL CHIPS IN ERROR 501 | 000000000 | 000000000 | 000000000 | 000000000 | 000000000 |
| RAIM PROTECT 502 | | MARKED | | | |
| SYSTEM TRAP REPORT 503 | 000000000 | 000000000 | 000000000 | 000000000 | 000000000 |
| FAIL VECTOR 504 | 000000000 | 000000000 | 000000000 | 000000000 | 000000000 |
| FETCH STATUS 505 | GOOD, NO WRITEBACK | | | | |

FIG. 5

| | CHANNEL 0 | CHANNEL 1 | CHANNEL 2 | CHANNEL 3 | CHANNEL 4 |
|---|---|---|---|---|---|
| REAL CHIPS IN ERROR 601 | 00000000 | 00000000 | 00000000 | 00100100 | 00000000 |
| RAIM PROTECT 602 | | MARKED | | | |
| SYSTEM TRAP REPORT 603 | 00000000 | 00000000 | 00000000 | 00100100 CE TRAP | 00000000 |
| FAIL VECTOR 604 | 00000000 | 00000000 | 00000000 | 00100100 | 00000000 |
| FETCH STATUS 605 | CE, WRITEBACK | | | | |

FIG. 6

| 700 | CHANNEL 0 | CHANNEL 1 | CHANNEL 2 | CHANNEL 3 | CHANNEL 4 |
|---|---|---|---|---|---|
| REAL CHIPS IN ERROR 701 | 000000000 | 101001011 STALE | 000000000 | 000000000 | 000000000 |
| RAIM PROTECT 702 | | MARKED | | | |
| SYSTEM TRAP REPORT 703 | 000000000 | 000000000 | 000000000 | 000000000 | 000000000 |
| FAIL VECTOR 704 | 000000000 | 000000000 | 000000000 | 000000000 | 000000000 |
| FETCH STATUS 705 | CE, WRITEBACK | | | | |

FIG. 7

| 800 | CHANNEL 0 | CHANNEL 1 | CHANNEL 2 | CHANNEL 3 | CHANNEL 4 |
|---|---|---|---|---|---|
| REAL CHIPS IN ERROR 801 | 000000000 | 101001011 STALE | 000000000 | 001000100 | 000000000 |
| RAIM PROTECT 802 | | MARKED | | | |
| SYSTEM TRAP REPORT 803 | 000000000 | 000000000 | 000000000 | 001000100 CE TRAP | 000000000 |
| FAIL VECTOR 804 | 000000000 | 000000000 | 000000000 | 001000100 | 000000000 |
| FETCH STATUS 805 | CE, WRITEBACK | | | | |

FIG. 8

| | CHANNEL 0 | CHANNEL 1 | CHANNEL 2 | CHANNEL 3 | CHANNEL 4 |
|---|---|---|---|---|---|
| REAL CHIPS IN ERROR 901 | 000000000 | 101001011 STALE | 000000000 | 001000100 | 000000000 |
| RAIM PROTECT 902 | | MARKED | | | |
| SYSTEM TRAP REPORT 903 | 000000000 | 000000000 | 000000000 | 001000100 CE TRAP | 000000000 |
| FAIL VECTOR 904 | 000000000 | 101001011 STALE COUNTS | 000000000 | 001000100 BAD CHIPS | 000000000 |
| FETCH STATUS 905 | CE, WRITEBACK | | | | |

STALE DATA DETECTION IN MARKED CHANNEL FOR SCRUB

BACKGROUND

The present invention relates generally to computer memory, and more specifically, to stale data detection in a marked channel for a scrub in a computer memory Memory device densities have continued to grow as computer systems have become more powerful. With the increase in density comes an increased probability of encountering a memory failure during normal system operations. Techniques to detect and correct bit errors have evolved into an elaborate science over the past several decades. One detection technique is the generation of odd or even parity where the number of 1's or 0's in a data word are "exclusive or-ed" (XOR-ed) together to produce a parity bit. If there is a single error present in the data word during a read operation, it can be detected by regenerating parity from the data and then checking to see that it matches the stored (originally generated) parity.

The parity technique may be extended to not only detect errors, but to also correct errors by appending an XOR field, i.e., an error correction code (ECC) field, to each data, or code, word. The ECC field is a combination of different bits in the word XOR-ed together so that some number of errors can be detected, pinpointed, and corrected. The number of errors that can be detected, pinpointed, and corrected is related to the length of the ECC field appended to the data word. ECC techniques have been used to improve availability of storage systems by correcting memory device (e.g., dynamic random access memory or "DRAM") failures so that customers do not experience data loss or data integrity issues due to failure of a memory device.

Redundant array of independent memory (RAIM) systems have been developed to improve performance and/or to increase the availability of storage systems. RAIM distributes data across several independent memory modules that each contain one or more memory devices. There are many different RAIM schemes that have been developed each having different characteristics, and different pros and cons associated with them. Performance, availability, and utilization/efficiency (the percentage of the disks that actually hold customer data) vary across different RAIM schemes. Improvements in one attribute may result in reductions in another.

One method of improving performance and/or reliability in memory systems is to mark individual memory chips as potentially faulty. In addition, when an entire memory channel fails, the channel itself may be marked as faulty. Channel marking allows the RAIM system to ignore a single channel (e.g., one out of five) during the ECC decoding and correcting phase of a fetch to improve correctability of the data. The channel mark guards against detected catastrophic channel errors, such as bus errors that cause bad cyclic redundancy check (CRC) or clock problems using software and/or hardware logic.

The software and/or hardware logic also supports two DRAM chip marks which are applied on a per-rank basis to guard against bad chips. These DRAM marks are used to protect the fetch data against chip kills (i.e., chips that have severe defects). However, if there is an overabundance of DRAM errors in a rank, the DRAM marks may not be sufficient to repair the chip errors. This increases the possibility for uncorrectable errors if additional chips fail after the two chips of that rank are marked. In addition, certain calibration errors can cause a high rate of channel errors that could lead to uncorrectable errors. If this happens, any number of DRAMs may be affected, causing DRAM mark availability to be limited.

Examples of RAIM systems may be found, for instance, in U.S. Patent Publication Number 2011/0320864, titled "Heterogenous Recovery in a Redundant Memory System", filed on Jun. 24, 2010, the contents of which are hereby incorporated by reference in its entirety; in U.S. Patent Publication Number 2011/0320869, titled "Heterogenous Recovery in a Redundant Memory System", filed on Jun. 24, 2010, the contents of which are hereby incorporated by reference in its entirety; and in U.S. Patent Publication Number 2012/0173936, titled "Channel Marking for Chip Mark Overflow and Calibration Errors", filed on Dec. 29, 2010, the contents of which are hereby incorporated by reference in its entirety.

SUMMARY

Embodiments include a system, computer program product, and method for stale data detection in a marked channel for a scrub. An aspect includes bringing the marked channel of the computer online, wherein the computer comprises a plurality of memory channels comprising the marked channel and a remaining plurality of memory channels that comprise unmarked channels. Another aspect includes performing a scrub read of an address in the plurality of memory channels. Another aspect includes determining whether data returned by the scrub read from the marked channel is valid or stale based on data returned from the unmarked channels by the scrub read. Another aspect includes based on determining that the data returned by the scrub read from the marked channel is valid, not performing a scrub writeback to the marked channel. Another aspect includes based on determining that the data returned by the scrub read from the marked channel is stale, performing a scrub writeback of corrected data to the marked channel

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Embodiments of stale data detection in a marked channel for a scrub are provided, with exemplary embodiments being discussed below in detail. During a recovery operation in a marked channel in a computer memory that implements RAIM/ECC, fetches and stores may continue to be performed in the remaining unmarked channels. After the recovery operation is complete, the marked channel contains stale data due to the stores that were performed in the unmarked channels during the recovery operation. A scrub operation that performs a scrub read across all the channels to detect errors, and then performs scrub writeback of ECC corrected data across all the channels in the memory, is then used to clean up the stale data in the marked channel before removing the channel mark; however, this may require a relatively long period of time to complete. Some of the data in the marked channel may still be valid after the recovery. Therefore, after a scrub read, the system may determine if the data returned from the marked channel comprises good data (i.e., valid data) or stale data based on the ECC information and the scrub data that was read from the other channels. If the marked channel is determined to contain stale data comprising a correctable error (CE), scrub writeback of corrected data is performed across all channels. However, if the marked channel is determined to contain good data, the scrub writeback for that scrub read is skipped. Skipping the scrub writeback based on detection of good data in the marked channel may shorten the time necessary to complete the scrub operation.

Scrub writeback may be performed for stale data in the marked channel that comprises a CE, as corrected data for the scrub writeback may be constructed from the scrub read data from the other channels. If a CE is detected in any of the unmarked channels based on the scrub read, scrub writeback may also be performed. The scrub operation may accumulate error counts for the unmarked channels, and, in some embodiments, error counts of the stale data may also be accumulated for the marked channel. In some embodiments, the channel mark may be removed after all the stale data in the marked channel has been corrected by the scrub operation. In other embodiments, there may be an additional second scrub pass after the stale data in the marked channel has been corrected and before the channel mark is removed. During this second scrub pass, error counts are accumulated for the marked channel to determine chip health in the marked channel. The system may either remove or keep the channel mark for the marked channel based on the number of chip errors determined by the second scrub pass. In the second scrub pass, in some embodiments, the data fetched from the marked channel by the second scrub read may be compared with the data that was written to the marked channel by the first scrub pass. If this data is not the same, then it is determined that there are errors in the marked channel.

In some embodiments, only unmarked channel data may be trapped, while in other embodiments marked channel data may also be trapped. The recovery operation in the marked channel may comprise any appropriate recovery, including but not limited to a Tier1 soft error retry/reset recovery, a Tier2 data lane repair recovery, or a Tier3 clock recovery operation. As used herein, the term "RAIM" refers to redundant arrays of independent memory modules (e.g., dual in-line memory modules or "DIMMs). In a RAIM system, if one of the memory channels fails (e.g., a memory module in the channel), the redundancy allows the memory system to use data from one or more of the other memory channels to reconstruct the data stored on the memory module(s) in the failing channel. The reconstruction is also referred to as error correction. As used herein, the term "correctable error" or "CE" refers to an error that can be corrected while the system is operational; thus, a CE does not cause a system outage. As used herein, the term "uncorrectable error" or "UE" refers to an error that cannot be corrected while the memory system is operational, and thus presence of a UE may cause a system outage, during which time the cause of the UE can be corrected (e.g., by replacing a memory device, by replacing a memory module, recalibrating an interface). In some embodiments, a UE may be tolerable by the memory system. For example, some types of recovery-induced UEs may be refetched later and return good data. Other types of UEs may cause jobs to fail and portions of the memory to be taken offline, but may not necessarily result in a system outage.

Figure 1:
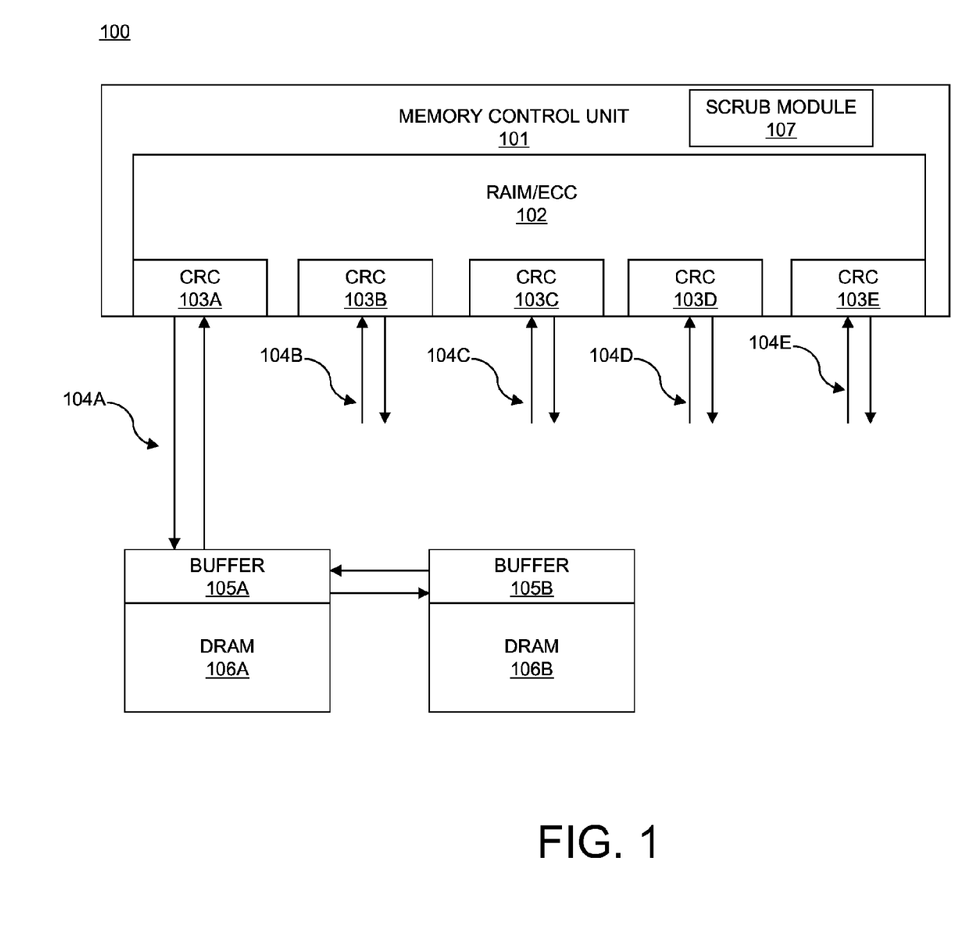
FIG. 1 depicts a memory system in accordance with an embodiment.

FIG. 1 illustrates a block diagram of a cascade interconnect memory system 100 that may be implemented by an embodiment. The memory system depicted in FIG. 1 includes multiple independent memory interface busses 104A-E that are logically aggregated together to operate in unison to support a single independent access request from a memory controller 101. The servicing of the single independent access request includes data and error detection/correction information distributed or "striped" across the memory interface busses 104A-E and associated DRAM devices located on the memory modules in each channel, such as the cascaded memory modules including buffers 105A-B and DRAM 106A-B associated with CRC module 103A, by a RAIM/ECC module 102. Each of memory interface busses 104A-E corresponds to a channel, and is in communication with one or more respective memory modules. The RAIM/ECC module 102 coordinates the striping of data and ECC across each of the parallel memory interface buses 104A-E via CRC modules 103A-E. CRC modules 103A-E perform error detection on data being transferred on the memory interface busses 104A-E between the memory controller 101 and the memory DRAM 106A-B.

In an embodiment, the memory system 100 depicted in FIG. 1 is a RAIM memory system and the five channels are lock step channels (i.e., the five memory interface buses 104 are accessed in unison with each other). The RAIM/ECC module 102 may have the property that one of the channel's data is the bitwise XOR of the other four channels' data. Additional checks are included in order to correct for additional errors. As used herein, the term "mark" refers to is an indication given to an ECC that a particular symbol or set of symbols of a read word are suspected to be faulty. The ECC can then use this information to enhance its error correction properties.

In an embodiment, when a channel mark is placed, the RAIM/ECC module 102 may correct at least one unknown bit error (and sometimes an entire unknown chip error), depending on how many additional chip marks (suspected chip errors) are in place. However, without a channel mark, a pattern with a channel error and a single bit error in another channel will cause an uncorrectable error. In accordance with an exemplary embodiment, if the error is caught by a channel's CRC module 103A-E, then a temporary mark can be placed which will allow the RAIM/ECC module 102 to correct additional possible errors. A permanent memory channel failure may require replacement, but the integrity of the concurrently accessed data is not destroyed (i.e., the error is a correctable error or a "CE") by the failure of a single memory channel. Upon memory channel failure, any subsequent reads are calculated from the distributed parity such that the memory channel failure is masked from the end user (i.e., the marked memory channel is ignored).

Scrub module 107 in the memory controller 101 performs scrub operations, which are discussed in further detail below with respect to FIGS. 3-9. The scrub module 107 may store addresses of stores that need to be retried after a recovery operation in a marked channel, and initiate the scrub operation for the stored addresses at the end of the recovery operation. If, based on ECC checkbits in the scrub read data retrieved from a particular address, there is a CE in any of the unmarked channels, or if there is stale data in the marked channel, the scrub module 107 issues a scrub writeback of corrected data. However, if there are no errors in the marked channel or in the unmarked channels, the scrub module 107 skips the scrub writeback.

Figure 2A:
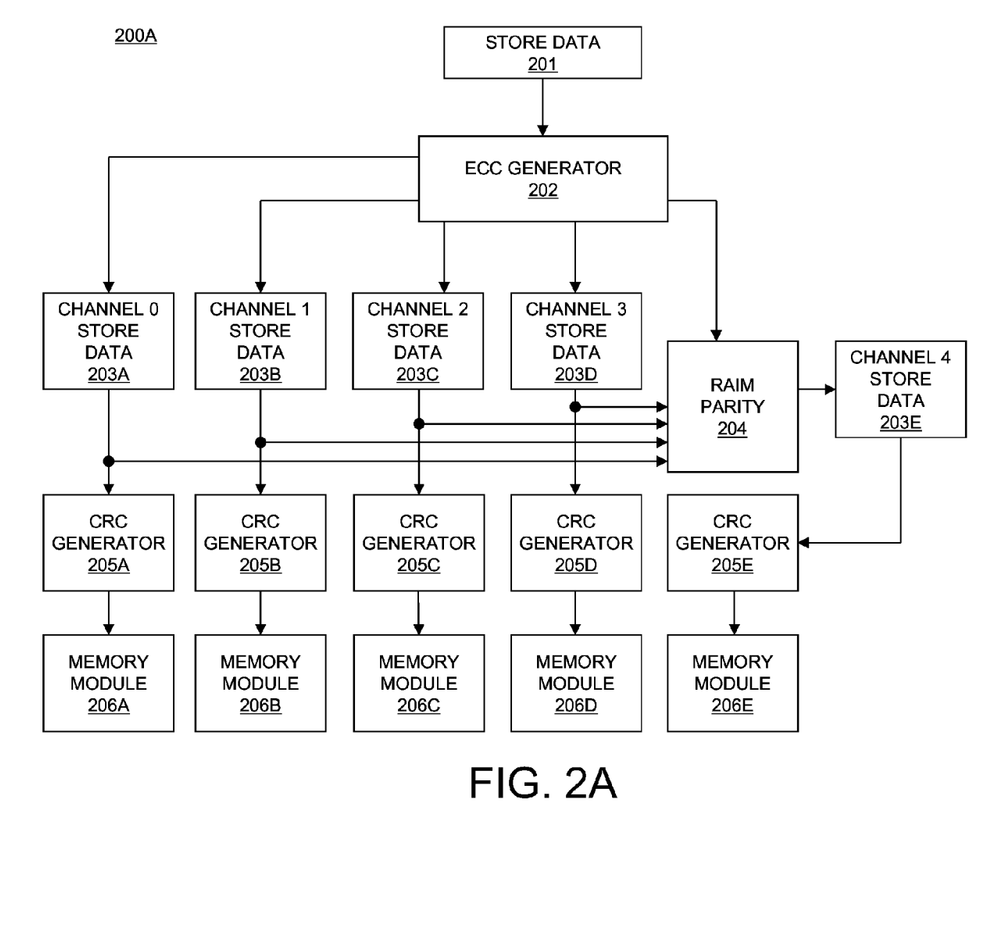
FIG. 2A depicts a store path of a memory system in accordance with an embodiment.
Figure 2B:
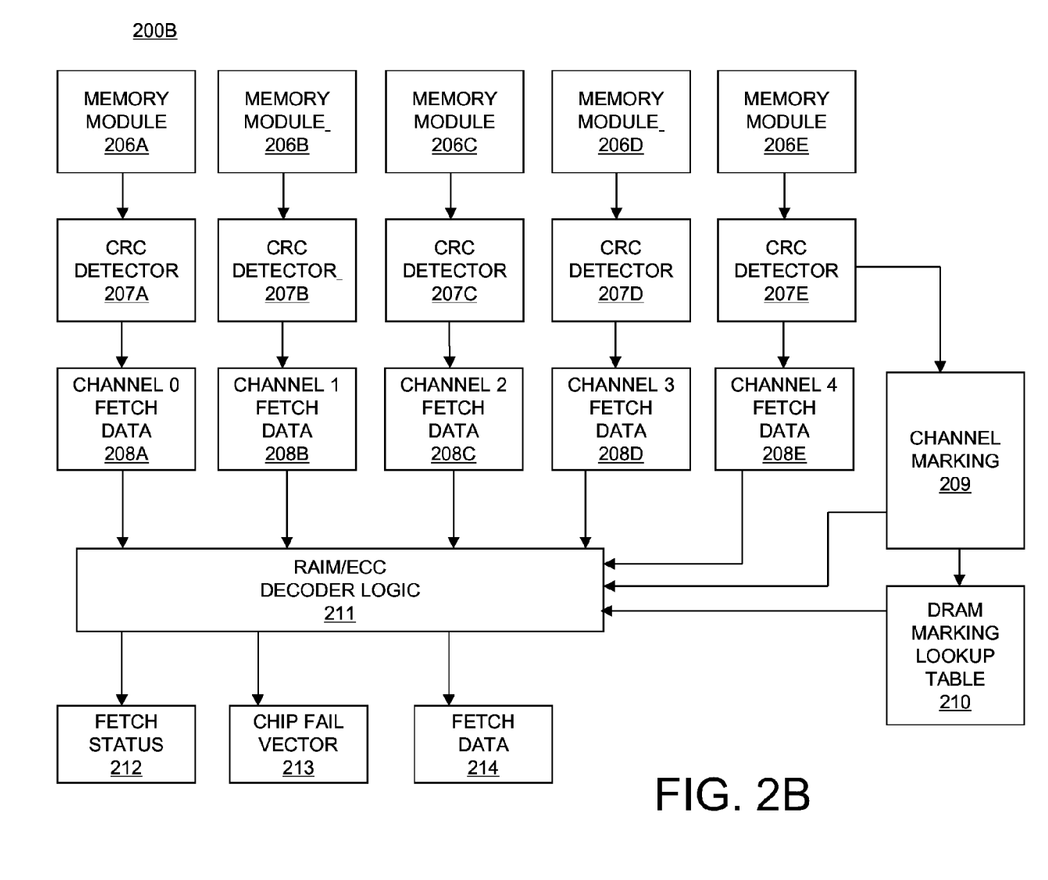
FIG. 2B depicts a fetch path of a memory system in accordance with an embodiment.

FIGS. 2A and 2B illustrate block diagrams of RAIM store path 200A and fetch path 200B that implement ECC and channel CRC in an embodiment. In an embodiment, the store path 200A is implemented by hardware and/or software located on the memory controller 101 and memory modules including buffers 105A-B and DRAM 106A-B as are shown in FIG. 1. The RAIM configuration depicted in FIG. 2A-B includes a memory channel (i.e., channel 4) that is dedicated to storing parity information. As depicted in FIG. 2A, data from the five channels are combined in a way that protects data against loss of any one memory channel.

Figure 3:
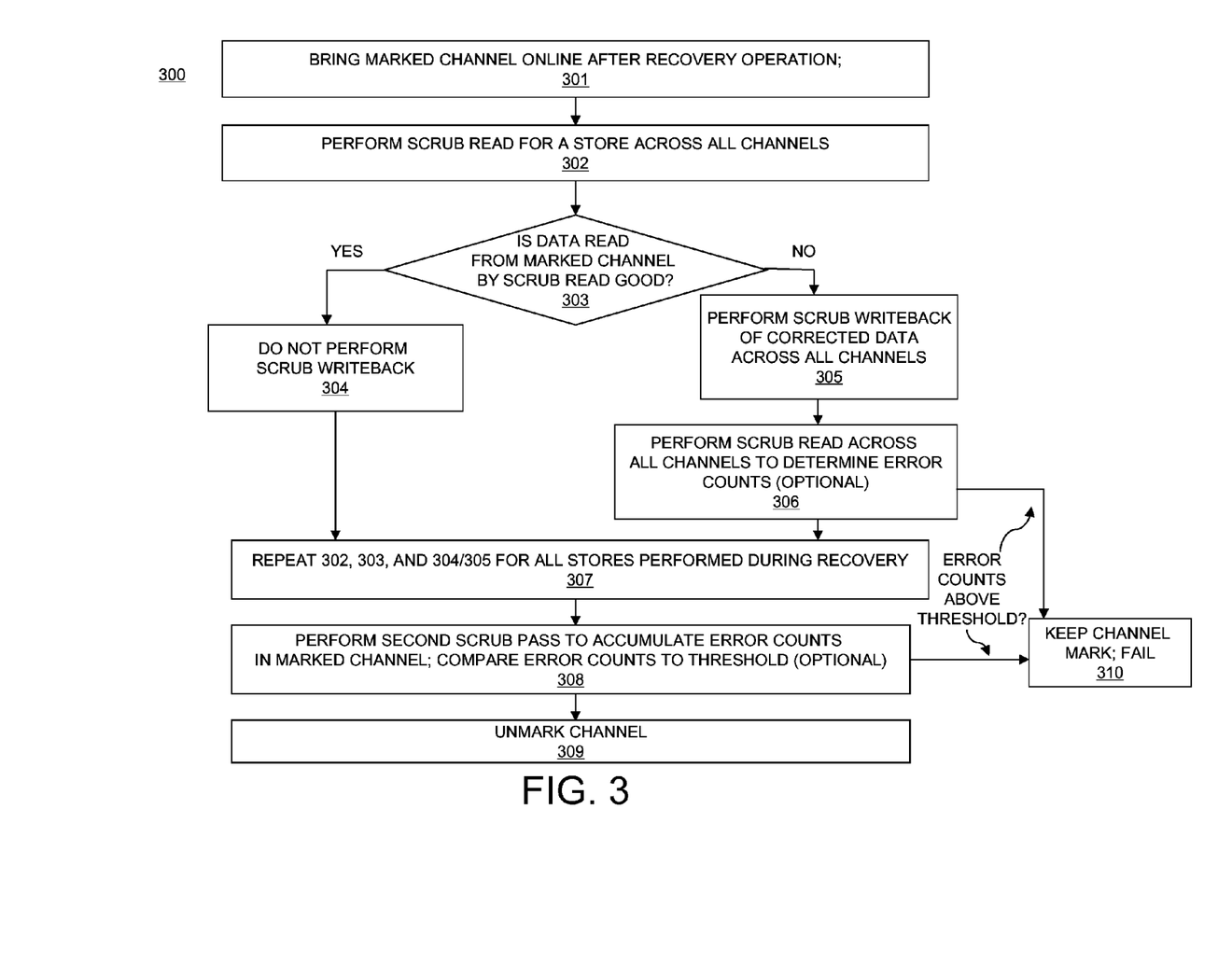
FIG. 3 depicts a process flow for stale data detection in a marked channel for a scrub in a memory system that in accordance with an embodiment.

In the RAIM store path 200A depicted in FIG. 2A, the ECC generator 202 (located in RAIM/ECC module 102 of FIG. 1) receives store data 201 and outputs four groupings of channel store data 203A-D that include ECC checkbits. The channel data 203A-D are input to individual CRC generators 205A-D, and are also input to a RAIM parity generator 204 that outputs RAIM parity bits as channel store data 203E which is input to individual CRC generator 205E. The combination of the ECC checkbits and the RAIM parity bits described above are the overall checkbits of the RAIM ECC. The channel store data 203A-E are input to the CRC generators 205A-E (located in CRC modules 103A-E of FIG. 1) to generate CRC bits for the channel store data 203A-E. Output from the CRC generators 205A-E (including CRC and data bits) are then output to the downstream bus for transmission to the memory modules 206A-E. As shown in FIG. 3, the data being stored on the memory modules 206A-E are supplemented by ECC. In an embodiment, the CRC bits are used for bus protection and are not stored.

In an embodiment, the fetch path 200B that is shown in FIG. 2B is implemented by hardware and/or software located on the memory controller 101 and memory modules including buffers 105A-B and DRAM 106A-B as are shown in FIG. 1. As shown in FIG. 2B, the RAIM fetch path includes receiving fetched data on an upstream bus from the memory modules 206A-E. The CRC detectors 207A-E (located in CRC modules 103A-E of FIG. 1) depicted in FIG. 2B are utilized to detect a channel error, and to temporarily mark a failing channel.

Output from the CRC detectors 207A-E are the channel fetch data 208A-E, which include data and ECC checkbits that were generated by ECC generator 202. In addition, the CRC detectors 207A-E output status to the channel marking logic 209 to indicate which channels are in error. In an embodiment the channel marking logic 209 generates marking data indicating which channels and memory chips (i.e. devices) are marked. The channel fetch data 208A-E and the marking data are input to RAIM/ECC decoder logic 211 (located in RAIM/ECC module 102 of FIG. 1) where channel fetch data 208A-E are analyzed for errors which may be detected and corrected using the RAIM/ECC and the marking data received from the channel marking logic 209. Output from the RAIM/ECC decoder logic 211 are the corrected fetch data 214 (for example, 64 bytes of fetched data), a fetch status 212 (which may comprise one of Good, CE, and UE), and chip fail vector 213. Chip fail vector 213 is used to track chip failures in the memory system, and may comprise a 45-bit vector in some embodiments, with 9 bits being assigned to each of the 5 channels. In some embodiments, DRAM marking lookup table decoder logic 210 is used to look-up channel and chip marks. The channel mark may be stored by rank in some embodiments. The known chip marks may also be stored by rank in some embodiments.

FIG. 3 illustrates a flowchart of a method 300 for stale data detection in a marked channel for a scrub. Method 300 may be implemented in scrub module 107 in the memory controller 101 as was shown in FIG. 1. First, in block 301, a marked channel is brought back online after a recovery operation. The recovery operation in the marked channel may comprise any appropriate recovery, including but not limited to a Tier1 soft error retry/reset recovery, a Tier2 data lane repair recovery, or a Tier3 clock recovery operation. During the recovery operation, stores and fetches have continued to be performed in the remaining channels, so the marked channel contains stale data. The addresses for stores that were performed during the recovery operation may be stored in scrub module 107 in some embodiments. In other embodiments, the scrub module 107 does not track store addresses during the recovery operation and scrubs every address in every rank in the memory after the recovery operation has completed. Next, in block 302, a scrub read at an address is performed across all the channels. The scrub read may be performed via fetch path 200B of FIG. 2B. Then, in block 303, it is determined whether the data returned from the scrub read from the marked channel is good (i.e., valid). This determination may be made based on ECC checkbits from the unmarked channels by RAIM/ECC decoder logic 211 of FIG. 2B. If it is determined in block 303 that the scrub read data is good, scrub writeback is skipped in block 304 and flow proceeds to block 306. If it is determined that the scrub read data is not good, scrub writeback of corrected data is performed across all channels in block 305 to correct the stale data. The scrub writeback may be performed via store path 200A of FIG. 2A. Scrub writeback may also be performed if a CE is detected in one of the unmarked channels. The corrected data may be constructed based on ECC checkbits read from the unmarked channels by the scrub read. From block 305, in some embodiments, flow then proceeds to optional block 306. In block 306, a scrub read across all channels is performed by the scrub module 107 to the same address as the scrub writeback that was performed in block 305 to determine whether the stale data and any other errors were eliminated by the writeback. In some embodiments, error counts may be accumulated by the scrub read of optional block 306, and these error counts may be compared to a predetermined error threshold. If the error counts accumulated by the scrub read of optional block 306 are greater than the predetermined error threshold, flow proceeds from block 306 to block 310, in which the marked channel remains marked with a failure condition, and method 300 is stopped.

If the error counts accumulated by the scrub read of optional block 306 are not greater than the predetermined error threshold, flow proceeds to block 307, or, in some embodiments, optional block 306 is skipped and the flow proceeds directly from block 305 to block 307. In block 307, blocks 302, 303, and 304 or 305 (and, optionally, block 306) are repeated for all stores that are being serviced by the scrub module 107. In some embodiments, the scrub module 107 services all stores that were performed during the recovery operation, at which point all stale data in the marked channel is been corrected. Error counts may be accumulated for CEs detected by the scrub reads in the unmarked channels during blocks 302-307 in some embodiments, and, in further embodiments, error counts may also be accumulated for the stale data in the marked channel during blocks 302-307. Next, in some embodiments, in block 308, an optional second scrub pass may be performed in which error counts are accumulated for the marked channel across all addresses that were serviced by the scrub module 107 to determine chip health in the marked channel. If the error counts that are accumulated by the optional second scrub pass of block 308 are above a predetermined error threshold, data in the marked channel is determined to be bad by the second scrub pass of block 308, and flow proceeds from block 308 to block 310, in which the marked channel remains marked with a failure condition 310, and the method 300 is stopped. The second scrub pass of block 308 may be stopped, and flow may proceed to block 310, based on the error counts reaching the predetermined error threshold in some embodiments. If the error counts accumulated by the second scrub pass of block 308 are not above the predetermined threshold, flow proceeds from block 308 to block 309, in which the marked channel is unmarked by channel marking logic 209. In some embodiments, the second scrub pass of block 308 may be skipped, and flow may proceed directly from block 307 to block 309.

Figure 4:
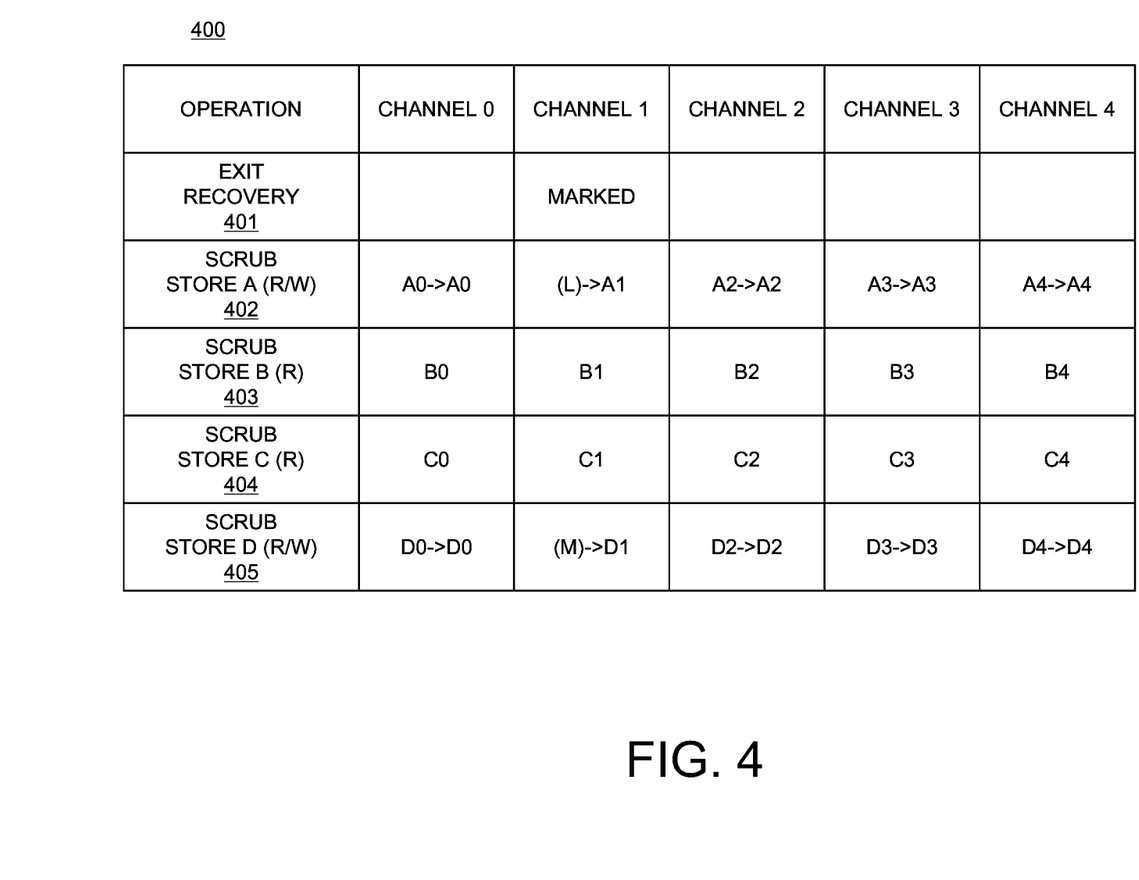
FIG. 4 depicts a chart of an example of stale data detection in a marked channel for a scrub in a memory system in accordance with an embodiment.

FIG. 4 is a chart 400 showing an example of stale data detection in a marked channel for a scrub. In the example of FIG. 4, channel 1 is the marked channel, and stores A, B, C, and D were performed across channels 0 and 2-4 during a recovery operation in channel 1. In row 401, channel 1 exits recovery, and is brought back online as a marked channel. Next, in row 402, a scrub is performed for store A. The scrub read for store A retrieves data A0 from channel 0, data L from channel 1, data A2 from channel 2, data A3 from channel 3, and data A4 from channel 4. It is then determined that data L that was retrieved from marked channel 1 is not good based on data and ECC checkbits in A0, A2, A3, and A4; therefore, corrected data A1 is constructed based on A0, A2, A3, and A4 and stored in channel 1 by a scrub writeback. A0, A2, A3, and A4 are also written back into their respective channels by the scrub writeback. In row 403, the scrub read for store B retrieves data B1 from marked channel 1; data B1 is determined to be good data based on data and ECC checkbits in data B0, B2, B3, and B4. Therefore, there is no scrub writeback for store B. Similarly, the scrub read for store C in row 404 retrieves data C1 from marked channel 1 which is determined to be good data based on data and ECC checkbits in data C0, C2, C3, and C4, so scrub writeback is also skipped for store C. For store D in row 405, data M is retrieved from marked channel 1, which is determined not to be good based on data and ECC checkbits in data D0, D2, D3, and D4, so scrub writeback is performed across all channels for store D, writing corrected data D1 into channel 1. D0, D2, D3, and D4 are also written back into their respective channels by the scrub writeback. After the scrub operation has been performed for all of stores A, B, C, and D, channel 1 should no longer contain stale data and may be unmarked; however, in some embodiments, a second scrub pass (as was described with respect to block 307 of FIG. 3) may be performed for stores A, B, C and D to determine any chip errors in channel 1 before unmarking channel 1.

Figure 5:
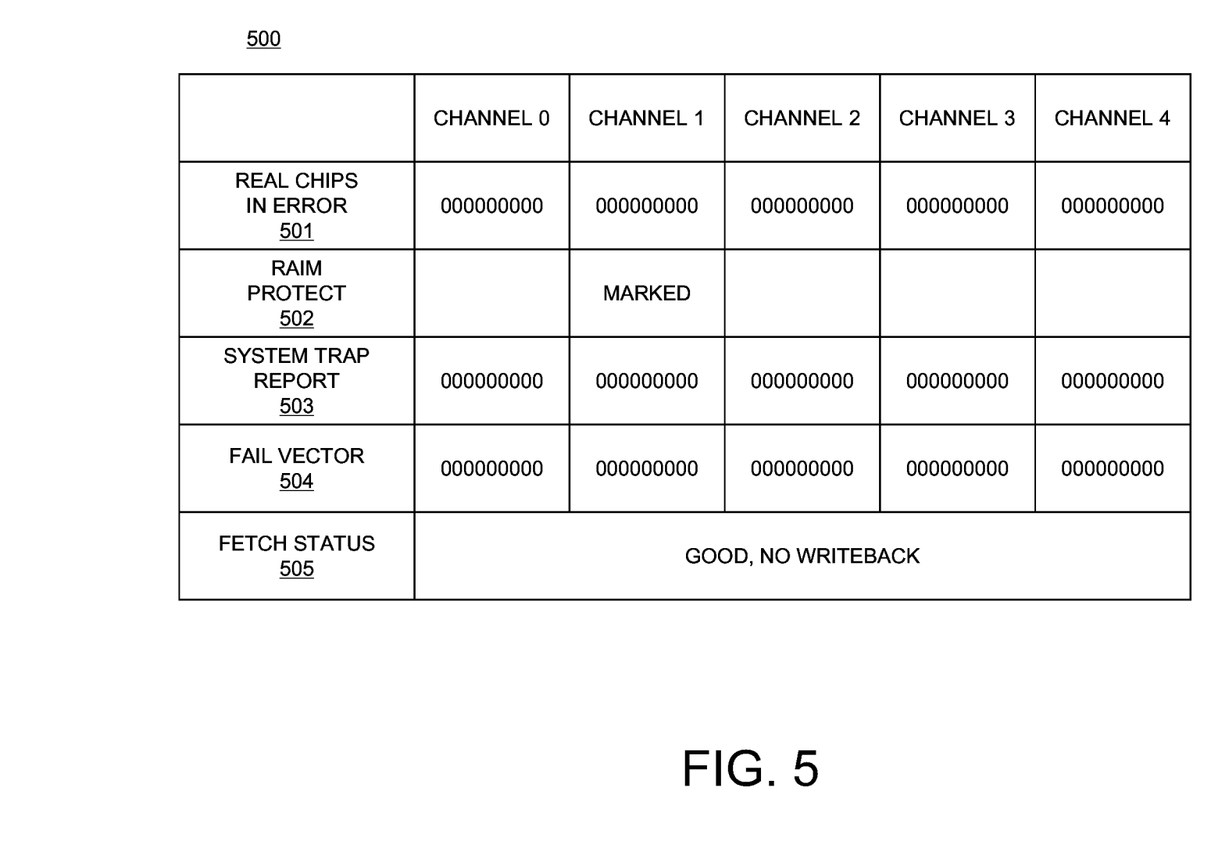
FIGS. 5-9 depicts charts of further examples of stale data detection in a marked channel for a scrub in a memory system in accordance with an embodiment.

FIGS. 5-9 illustrate further examples of stale data detection in a marked channel for a scrub, and are discussed with respect to FIG. 2B. FIG. 5 shows a chart 500 of examples of 45-bit vectors (i.e., 9 bits for each of individual channels 0-4) of real chips in error 501 and system trap report 503, and a fail vector 504, for a scrub read. RAIM protection markings 502 are also shown; in chart 500, channel 1 is marked. The chart 500 is for a scrub read that retrieves good data from the marked channel 1. The real chips in error vector 501 is output by DRAM marking lookup table decoder logic 210 of FIG. 2B; system trap report vector 502 is output by RAIM/ECC decoder logic 211 of FIG. 2B; and chip fail vector is stored in chip fail vector 213. These vectors are used to track, by rank, chip locations in the memory system that contain errors, so that bad DRAM chips in the memory system may be spared or marked, as necessary. As shown in FIG. 5, the scrub read data from channels 0-4 (including marked channel 1) is good (as indicated by the real chips in error 501, system trap reports 503, and fail vector 504), so the fetch status 505 (which is stored in fetch status 212 of FIG. 2B) for the scrub read is also good, and no scrub writeback is performed.

Figure 6:
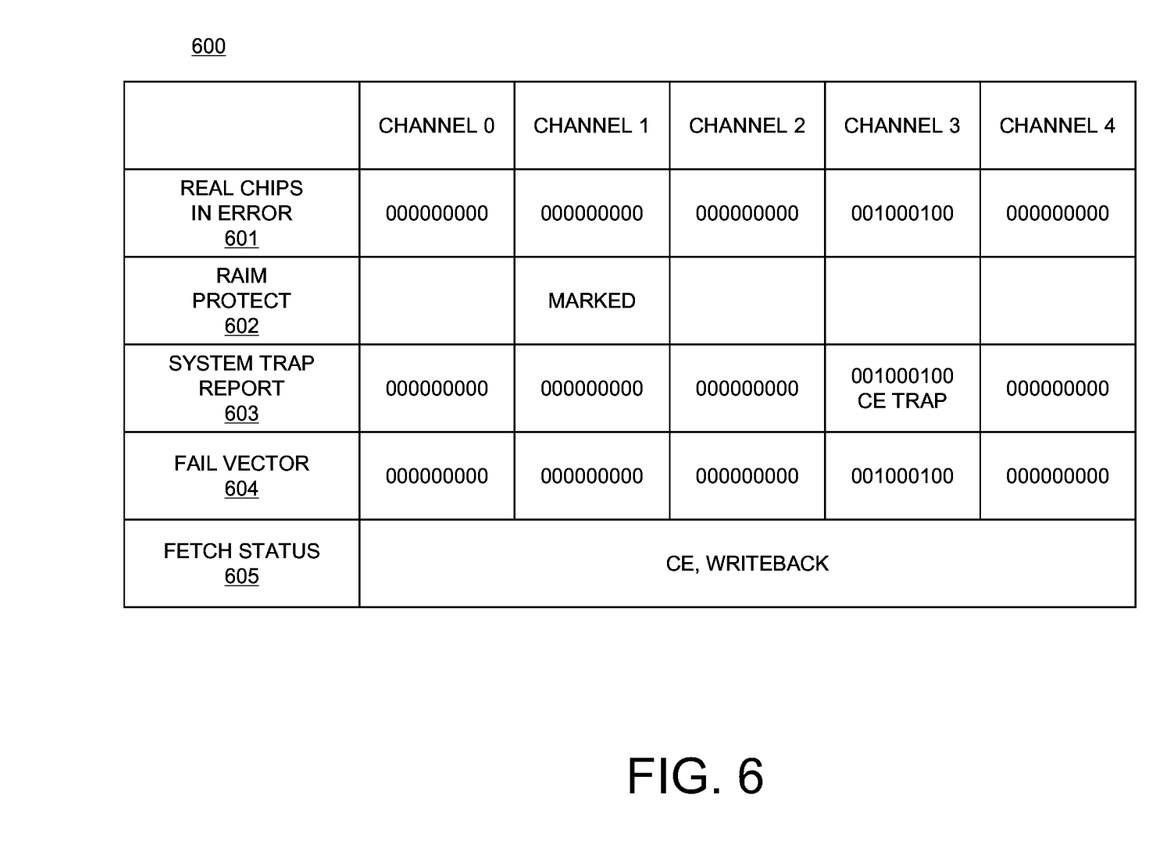

FIG. 6 shows a chart 600 of an example of real chips in error 601, system trap report 603, and fail vector 604 for a scrub read that detects a CE in an unmarked channel. Channel 1 is marked, as indicated by RAIM protection marking 602. In chart 600, a CE is detected in the data returned by the scrub read from unmarked channel 3; therefore, the fetch status 605 of the scrub read is "CE", and writeback is performed to correct the error in channel 3, in addition to writing good data to back to channels 0, 1, 2, and 4. The error in unmarked channel 3 is trapped by system trap report 603.

Figure 7:
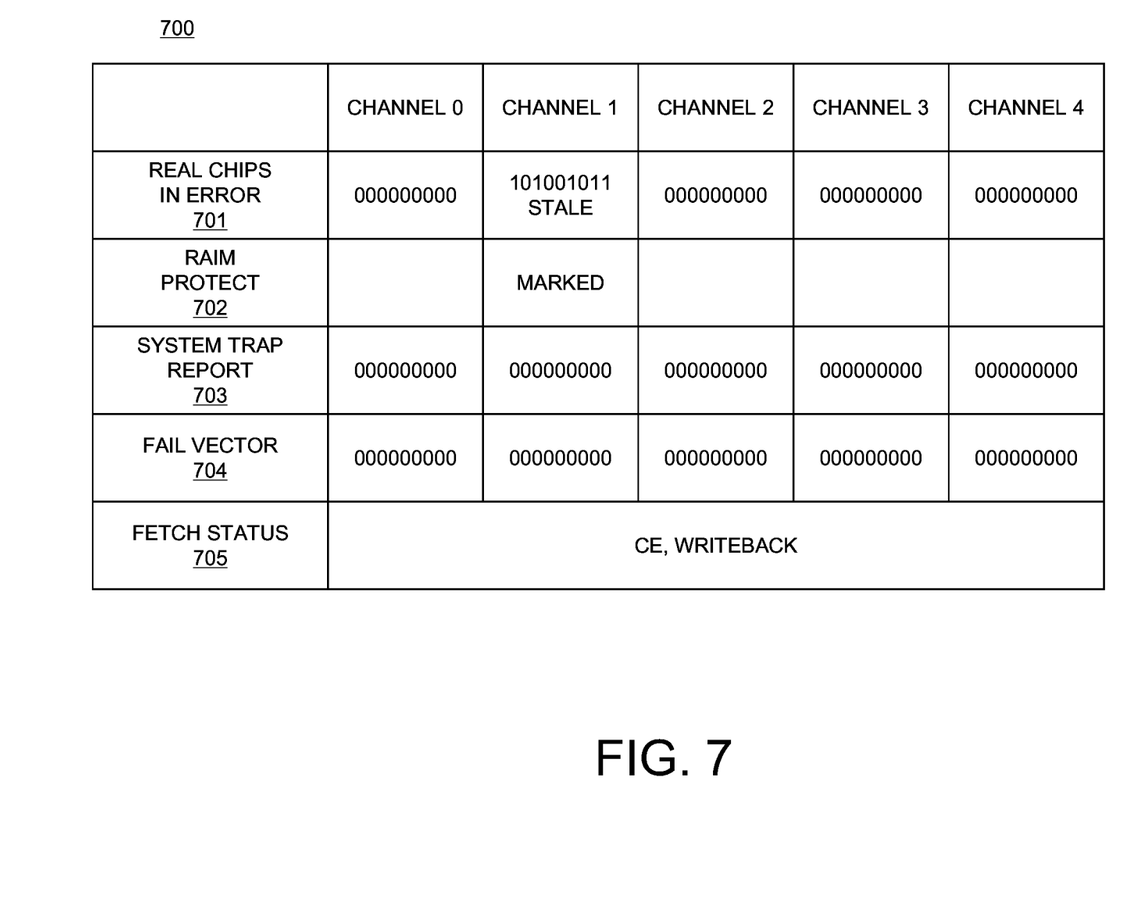

FIG. 7 shows a chart 700 of an example of real chips in error 701, system trap report 703, and fail vector 704 for a scrub read that detects stale data in a marked channel. Channel 1 is marked, as indicated by RAIM protection marking 702. In chart 700, stale data is returned by the scrub read from marked channel 1; therefore, the fetch status 705 of the scrub read is "CE", and writeback is performed to correct the stale data in marked channel 1, in addition to writing good data to back to channels 0, 2, 3, and 4.

Figure 8:
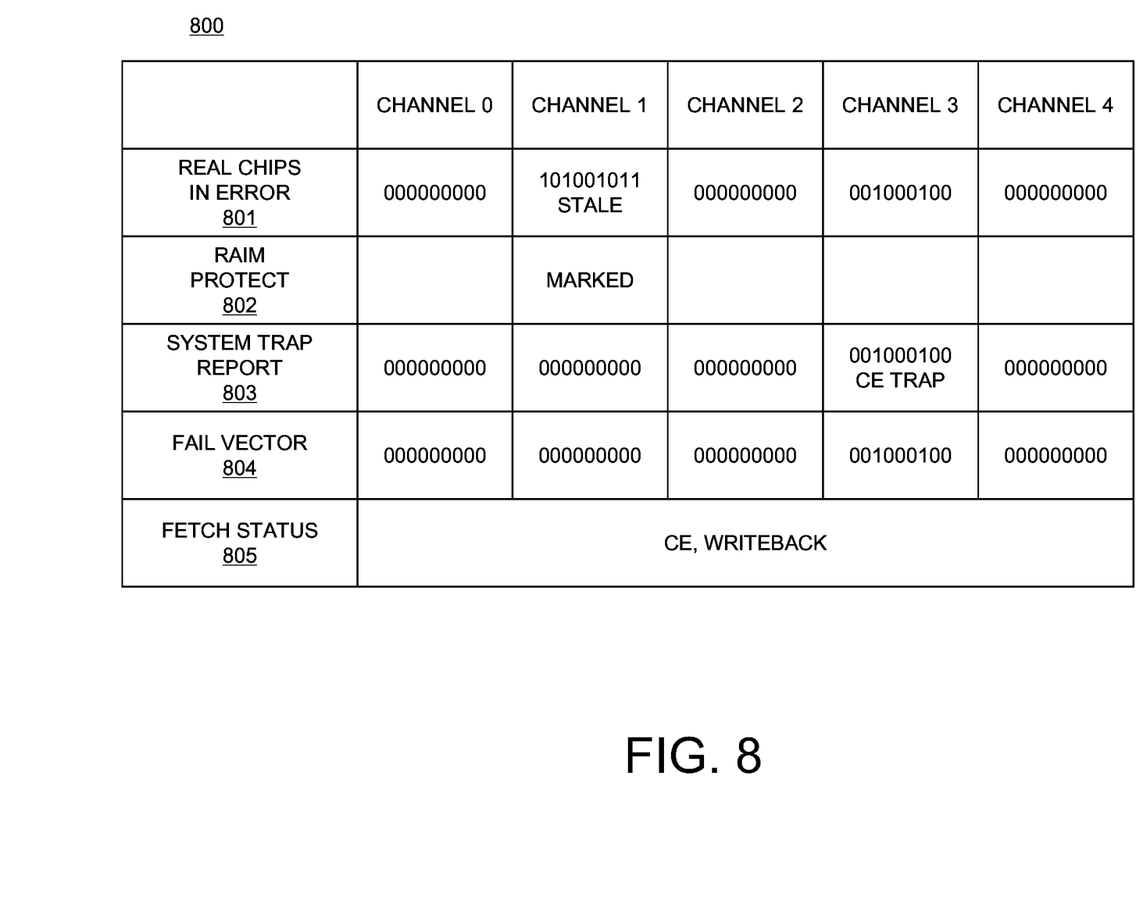

FIG. 8 shows a chart 800 of an example of real chips in error 801, system trap report 803, and fail vector 804 for a scrub read that detects stale data in a marked channel and also a CE in an unmarked channel. Channel 1 is marked, as indicated by RAIM protection marking 802. In chart 800, stale data is returned by the scrub read from marked channel 1, and a CE is also detected in the data returned by the scrub read from in unmarked channel 3. Therefore, the fetch status 805 of the scrub read is "CE", and writeback is performed to correct the stale data in marked channel 1 and the CE in channel 3, in addition to writing good data to back to channels 0, 2, and 4. The error in unmarked channel 3 is trapped by system trap report 803, and indicated in fail vector 804.

Figure 9:
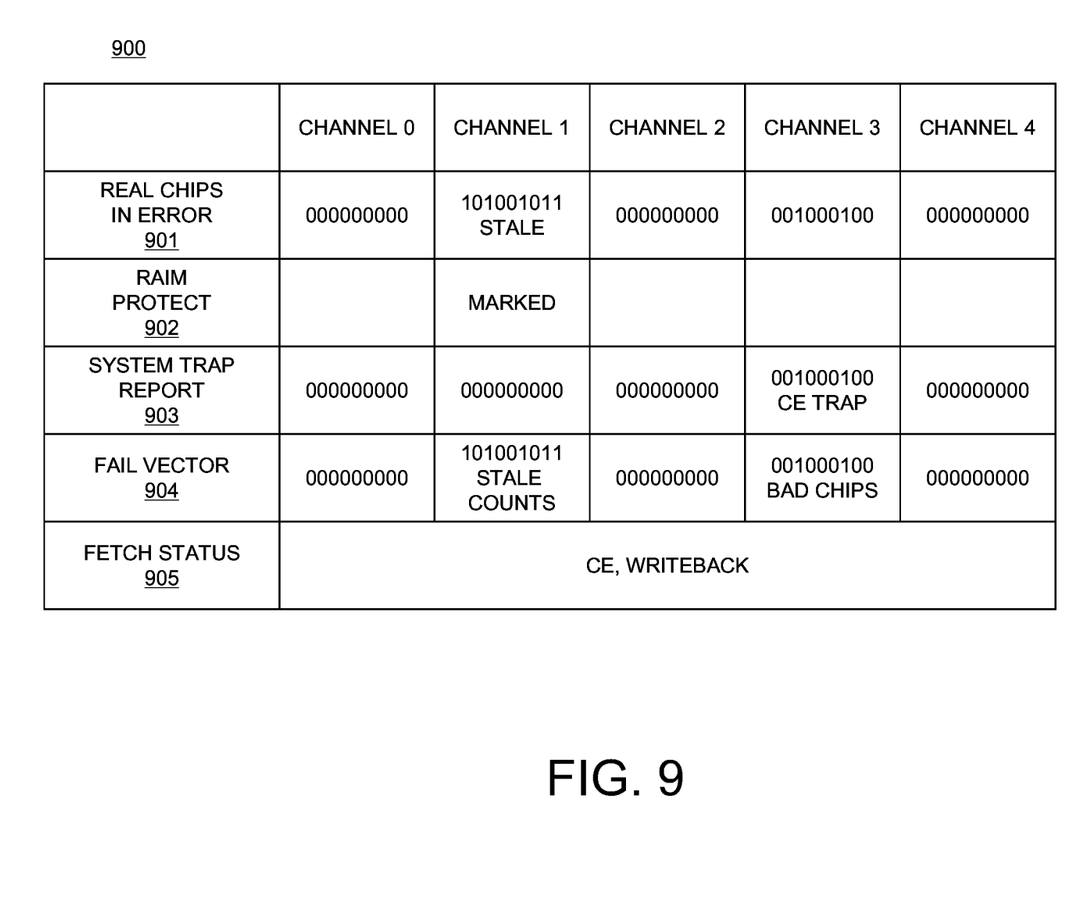

FIG. 9 shows a chart 900 of an example of real chips in error 901, system trap report 903, and fail vector 904 for a scrub read that detects stale data in a marked channel and a CE in an unmarked channel. In the embodiment of FIG. 9, bad chip locations are counted in the marked and unmarked channels. Channel 1 is marked, as indicated by RAIM protection marking 902. In chart 900, stale data is returned by the scrub read from marked channel 1 and a CE is detected in the data returned by the scrub read from in unmarked channel 3. Therefore, the fetch status 905 of the scrub read is "CE", and writeback is performed to correct the stale data in marked channel 1 and the CE in channel 3, in addition to writing good data to back to channels 0, 2, and 4. The error in unmarked channel 3 is trapped by system trap report 903. The fail vector 904 indicates bad chip locations in unmarked channel 3, and also counts the stale data in marked channel 1.

In some embodiments, fail vectors (e.g., fail vector 504 of FIG. 5, fail vector 604 of FIG. 6, fail vector 704 of FIG. 7, fail vector 804 of FIG. 8, and fail vector 904 of FIG. 9) may used to update counters (e.g., one for each of the 9 DRAM chips in each of the 5 channels) located in scrub module 107 that keep track of total error counts. These total error counts may be used to determine whether a recovery operation is needed in a channel.

As will be appreciated by one skilled in the art, one or more aspects of the present invention may be embodied as a system, method or computer program product. Accordingly, one or more aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, one or more aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Figure 10:
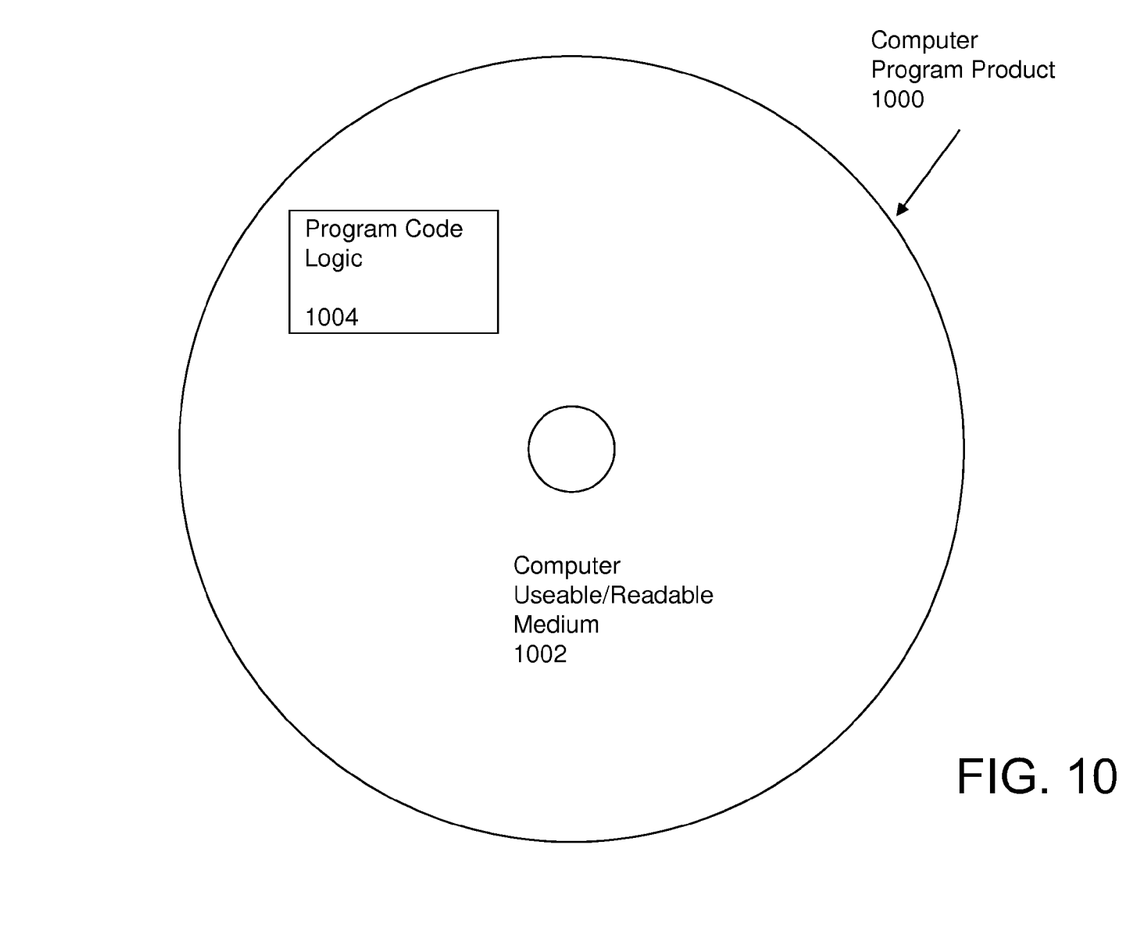
FIG. 10 illustrates a computer program product in accordance with an embodiment.

Referring now to FIG. 10, in one example, a computer program product 1000 includes, for instance, one or more storage media 1002, wherein the media may be tangible and/or non-transitory, to store computer readable program code means or logic 1004 thereon to provide and facilitate one or more aspects of embodiments described herein.

Program code, when created and stored on a tangible medium (including but not limited to electronic memory modules (RAM), flash memory, Compact Discs (CDs), DVDs, Magnetic Tape and the like is often referred to as a "computer program product". The computer program product medium is typically readable by a processing circuit preferably in a computer system for execution by the processing circuit. Such program code may be created using a compiler or assembler for example, to assemble instructions, that, when executed perform aspects of the invention.

Technical effects and benefits include reduced time required to complete a scrub operation after a recovery operation in a marked channel.

The terminology used herein is for the purpose of describing particular embodiments only and is not intended to be limiting of embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments have been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles and the practical application, and to enable others of ordinary skill in the art to understand the embodiments with various modifications as are suited to the particular use contemplated.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments are described above with reference to flowchart illustrations and/or schematic diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer system for stale data detection in a marked channel for a scrub, the system comprising:
   a memory control unit;
   a plurality of memory channels in communication with the memory control unit, wherein one of the plurality of memory channels comprises the marked channel and the remaining plurality of memory channels comprise unmarked channels; and
   a scrub module in the memory control unit, the system configured to perform a method comprising:
      bringing the marked channel online;
      performing a scrub read of an address in the plurality of memory channels;
      determining whether data returned by the scrub read from the marked channel is valid or stale based on error correction code (ECC) checkbits in data returned from the unmarked channels by the scrub read;
      based on determining that the data returned by the scrub read from the marked channel is valid, not performing a scrub writeback to the marked channel; and
   based on determining that the data returned by the scrub read from the marked channel is stale, performing a scrub writeback of corrected data to the marked channel, wherein performing the scrub writeback of corrected data comprises:
      determining the corrected data for the marked channel based on the ECC checkbits in the data returned from the unmarked channels; and
      storing the determined corrected data at the address in the marked channel.

2. The system of claim 1, further comprising bringing the marked channel online based on completion of a recovery operation in the marked channel.

3. The system of claim 2, wherein stores are performed at a plurality of addresses in the unmarked channels during the recovery operation, and further comprising performing a scrub read for each of the plurality of addresses.

4. The system of claim 1, further comprising based on determining that data returned by the scrub read from one of the unmarked channels comprises a correctable error (CE), performing the scrub writeback of corrected data.

5. The system of claim 4, further comprising determining an error count for the one of the unmarked channels based on the CE.

6. The system of claim 1, further comprising:
   based on completing the scrub writeback of corrected data, performing a second scrub read at the address;
   determining whether the data returned by the second scrub read from the marked channel comprises an error; and
   based on determining that the data returned by the second scrub read from the marked channel comprises an error, determining a failure in the marked channel.

7. The system of claim 6, further comprising:
   determining a number of errors in the marked channel for a plurality of addresses;
   comparing the number of errors to a predetermined error threshold; and
   unmarking the marked channel based on the number of errors being lower than the predetermined error threshold.

* * * * *